United States Patent [19]
Stadtmiller

[11] 3,724,963
[45] Apr. 3, 1973

[54] QUILL STOP AND GAUGE THEREFOR

[76] Inventor: Malcolm L. Stadtmiller, 1457 Ferguson Way, San Jose, Calif.

[22] Filed: Sept. 20, 1971

[21] Appl. No.: 181,963

[52] U.S. Cl. ................................. 408/14, 33/185 R
[51] Int. Cl. ........................................... B23b 47/00
[58] Field of Search .......... 408/14, 11, 241; 33/185 R, 33/181 R; 90/11 E; 82/34 B

[56] References Cited

UNITED STATES PATENTS

| | | | |
|---|---|---|---|
| 3,224,104 | 12/1965 | Platt | 33/185 X |
| 3,037,405 | 6/1962 | Steyskal | 408/241 |

*Primary Examiner*—Gil Weidenfeld
*Attorney*—Leslie A. Hansen

[57] ABSTRACT

The disclosed embodiment of the present invention is a tool travel gauge which permits setting of one extreme limit of tool travel with respect to a workpiece. The gauge generally includes a member having a plurality of retaining surfaces thereon and spaced from one another along a longitudinal axis parallel to the tool feeding axis. A stop in the form of a clip is disposed for being received on any one of the retaining surfaces and is disposed for being engaged by an abutment mounted on the quill of the machine tool. Fine adjustment is provided by a micrometer screw which is adapted to move the member along its longitudinal axis with respect to the housing of the machine tool.

7 Claims, 4 Drawing Figures

PATENTED APR 3 1973
3,724,963
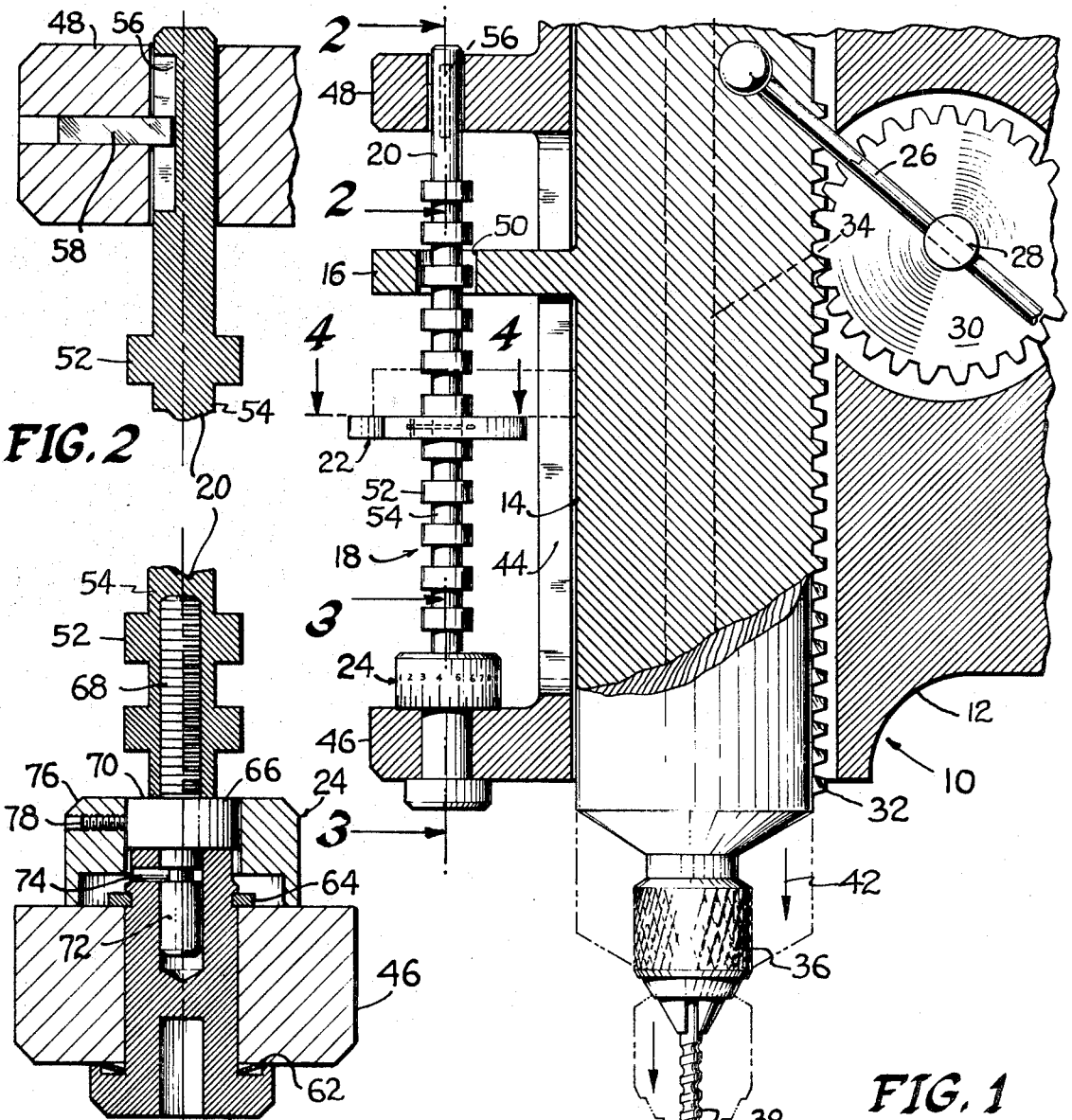
FIG. 2
FIG. 3
FIG. 4
FIG. 1
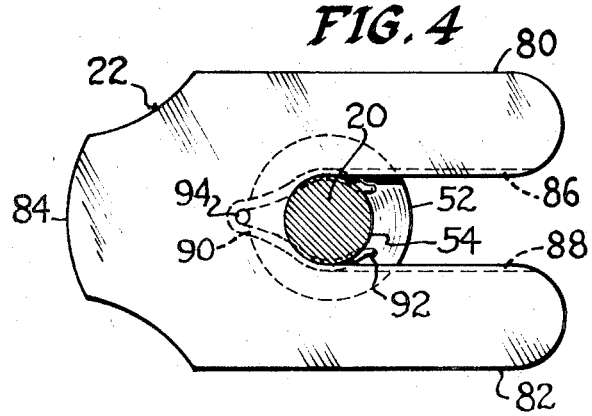
INVENTOR.
Malcolm L. Stadtmiller
BY
Leslie M. Hansen
HIS ATTORNEY

QUILL STOP AND GAUGE THEREFOR

This invention relates generally to a mechanism for restricting the length of travel of a tool and the like with respect to a workpiece, and more particularly to a gauge which permits both coarse and fine adjustment of the limits of the tool travel with respect to the workpiece. This invention has particular application with drill presses, but it is to be understood that it may be employed with any machine tool in which it is desired to limit the length of travel of the tool with respect to a workpiece.

BACKGROUND

In performing a cutting operation on a machine tool, it is often desired to restrict the length of travel of the tool with respect to the workpiece within predetermined limits. This feature is desirable when a number of identical machine cuts are to be made in succession. The machine operator employing such a tool travel limiting mechanism is not required to make a new measurement with each cut. Furthermore, the machine operator is free to make the complete cut without stopping at intermediate points to make repeated measurements to determine the extent of the cut.

Quite often, it is impossible to measure the amount of the cut with respect to the workpiece, since the cut may not be easily accessible, as in the case of drilling a hole in a workpiece. Under such circumstances, the machine tool operator is required to use a different reference for determining the amount of the cut. By employing a gauge which can be set to determine the length of the cut, this difficulty is overcome.

Tool travel limiting mechanisms are old in the art, per se, but such prior known mechanisms suffer from one or more disadvantages. One of the prior known mechanisms for limiting the travel of the tool includes a rod which is provided with micrometer threads along its entire length and is mounted parallel to the movement of the machine tool. A nut on the rod is moved to a position corresponding with the length of the tool travel and an abutment on the tool holding mechanism is disposed for engaging the nut and limiting the travel of the tool. This type of mechanism requires a considerable amount of the machine operator's time to alter the tool displacement limits. That is, this type of mechanism suffers from the disadvantage of not being able to provide a rapid change in its adjustment. If such a mechanism is provided with coarse threads so that such a change can be made rapidly, the accuracy of the mechanism is greatly reduced.

Other tool displacement limiting mechanisms are capable of both coarse adjustment and fine adjustment. However, those mechanisms which are presently known are relatively difficult to adjust and employ complicated structures which interfere with the efficient operation of the machine tool.

STATEMENT OF THE INVENTION

Accordingly, it is an object of the present invention to provide a mechanism for restricting the length of travel of a tool with respect to a workpiece which is capable of both coarse and fine adjustment.

Another object of the present invention is to provide a mechanism for gauging the length of travel of a tool with respect to a workpiece within certain limits, one of which is readily presettable.

Still another object of the present invention is to provide a tool travel limiting mechanism which is relatively uncomplicated and does not interfere with the efficient operation of the machine tool.

A feature of the present invention resides in the provision of a member having a plurality of retaining surfaces thereon spaced from one another along a longitudinal axis parallel to the tool feed axis and a stop disposed for being received on any one of the surfaces and for being engaged by an abutment on the tool feed mechanism. The stop is quickly and easily moved by a machine tool operator from one recess to another to alter the coarse dimension of the tool travel. A further feature of the present invention resides in the provision of a micrometer screw mounted between the member and a housing of the machine tool for effecting fine adjustment of the tool travel.

These and other objects, features and advantages of the present invention will be more fully realized and understood from the following detailed description, when taken in conjunction with the accompanying drawings, wherein:

FIG. 1 is a plan view partially in section and broken away of a machine tool, with a tool travel gauge constructed in accordance with the principles of the present invention mounted thereon;

FIG. 2 is a sectional view taken generally along line 2—2 of FIG. 1;

FIG. 3 is a sectional view taken generally along line 3—3 of FIG. 1; and

FIG. 4 is a sectional view taken generally along line 4—4 of FIG. 1.

Like reference numerals throughout the various views of the drawing are intended to designate the same elements and components.

GENERAL DESCRIPTION

FIG. 1 illustrates a feeding mechanism, tool, and tool holding structure of a drill press, generally designated with the reference numeral 10, which are supported in a housing 12. A quill 14 of the machine tool supports a collar 16. The housing 12 also supports a tool travel gauge, constructed in accordance with the principles of the present invention and generally designated with the reference numeral 18, which is mounted for longitudinal movement in the direction of the tool travel thereon. The gauge 18 is generally formed of a longitudinally extending member 20 having a plurality of retaining surfaces spaced equidistant from one another along its length and disposed for receiving a plate 22 thereon. A micrometer screw, generally designated with the reference numeral 24, is disposed for moving the member 20 in a longitudinal direction a distance at least equal to the distance between the centers of adjacent retaining surfaces on the member 20. When the feed mechanism of the machine tool 12 is set in motion by an operator, the tool is advanced until the collar 16 engages a plate 22, the position of which is determined by manual placement of the plate 22 on an appropriate retaining surface of the member 20 and adjusting the micrometer screw 24.

DETAILED DESCRIPTION

With reference to the figures of the drawing in detail, the drill press 10 is provided with a feed mechanism which generally includes a rod shaped feed handle 26, a feed shaft 28, a pinion gear 30, and the quill 14 having a rack 32 mounted thereon and in driving relationship with the gear 30. The feed shaft 28 is rigidly secured to the gear 30 and supports the feed handle 26 in one end thereof. Quill 14 is mounted in the housing 12 and is disposed for longitudinal movement with respect thereto. Accordingly, rotation of the feed handle 26 by a machine tool operator causes rotation of the gear 30 and translation of the quill 14 in a longitudinal direction.

A spindle 34 extends through the quill 14 and is mounted for rotary motion therein. A tool chuck 36 is mounted on one end of the spindle 34 and supports a tool 38 therein which is disposed for engaging a workpiece 40 and performing a cutting operation thereon. Rotation of the feed handle 26 by a machine tool operator causes the quill 14, chuck 36, and tool 38 to move in a longitudinal direction as indicated by an arrow designated with the reference numeral 42. The spindle 34 imparts rotary motion to the chuck 36 and tool 38 while they are being moved by the quill 14 in the longitudinal direction to perform the cutting operation on the workpiece 40. In the case of a drill press, of course, the cutting operation will result in a hole being cut in the workpiece 40.

As previously mentioned, it is desirable to accurately gauge the extent of the cut, or the depth of the hole which is being cut in the workpiece 40. The extent of such a cut can be preset by the tool travel gauge 18, which will be described in greater detail hereinbelow.

A slot 44 is provided in the housing 12 which exposes a surface of the quill 14. A mounting ear 46, which is integral with the housing 12 is provided at one end of the slot 44 and a collar 48, which is also integral with the housing 12 is provided at the other end of the slot 44. The collar 16 which is mounted on the quill 14 extends through the slot 44 and is provided with an aperture 50 therein. Member 20 is supported for longitudinal movement with respect to the housing 12 by means of the micrometer screw 24 which is mounted in the mounting ear 46. The other end of the member 20 extends through the collar 28 and is disposed for longitudinal movement therein as will be apparent from the description of FIG. 2 hereinbelow.

The member 20 is illustrated as having a plurality of enlarged annular portions 52 separated from one another by annular recesses 54, which are space equidistant from one another along the length of the member 20. The width of each of the annular recesses 54 are equal to one another and are of a dimension to accommodate the thickness of the stop plate 22 therein. Accordingly, each of the recesses 54 form a retaining surface for supporting the plate 22. Member 20 extends through the aperture 50 in the collar 16 and the bottom surface of the collar forms an abutment which is disposed for engaging the upper surface of the plate 22 during movement of the quill 14 in the longitudinal direction and restricting further movement of the quill. Accordingly, the extreme limit of tool travel can be accurately established by appropriate placement of the plate 22 in one of the recesses 54 and adjustment of the micrometer screw 24. Accordingly, a coarse adjustment of the limit of tool travel is provided by placement of the plate 22 in an appropriate one of the recesses 54 and fine adjustment of the tool travel is provided by longitudinal movement of the member 20 with respect to the housing 12 by means of the micrometer screw 24.

The support for the upper end of member 20 in the collar 48 is illustrated in greater detail in FIG. 2. As shown therein, the member 20 is provided with a keyway 56 which is disposed for receiving a key 58 therein which is mounted in the collar 48. Accordingly, the member 20 is permitted to move in a longitudinal direction, but is restricted from rotary motion by the key 58.

The micrometer screw 24 is illustrated in greater detail in FIG. 3. As shown therein, a mounting stud 60 extends through an aperture in the mounting ear 46 and is rigidly secured therein by means of shoulder 62 engaging a bottom surface of the mounting ear 46 and a snap ring 64 engaging an upper surface thereof. A screw 66 is provided with micrometer threads on a portion 68 thereof which are disposed for engaging an internally threaded portion in one end of the member 20. The screw 66 is provided with an enlarged annular portion 70 and a shaft 72 extending therefrom. Shaft 72 is disposed for being received in a central aperture extending into the mounting stud 60 and is mounted for rotary motion therein. A roll pin 74, which is rigidly mounted in the stud 60, is disposed for being received in an annular recess of the shaft 72 for restricting longitudinal movement of the shaft with respect to the mounting stud 60, but permitting rotational movement with respect thereto. A vernier ring 76 is mounted on the enlarged annular portion 70 of the screw 66 and is formly secured thereto by means of a set screw 78. Rotation of the vernier ring 76 causes rotation of the screw 66, thereby displacing the member 20 in a longitudinal direction. It will be noted that the length of the micrometer threaded portion 68 is of sufficient length to cause the member 20 to move in a longitudinal direction a distance at least equal to the distance between the centers of adjacent recesses 54, thereby permitting fine adjustment of the position of the member 20 with respect to the housing 12. The vernier ring 86 is provided with a micrometer scale thereon as shown in FIG. 1 and a fiducial mark (not shown) is provided on the upper surface of the mounting ear 46 in relative proximity to an edge of the vernier ring 76.

The stop plate 22 mounted on the member 20 is better illustrated in FIG. 4. As shown therein, the stop plate 22 is a forked shaped member formed by a pair of fingers 80 and 82 which are joined by a portion 84, which portion is suitable for being manually gripped to permit the plate 22 to be manually inserted on and retracted from the recesses 54. The internal surfaces of the fingers 80 and 82 are provided with recesses 86 and 88, respectively, which extend to and are contiguous with a recess 90. The recess 90 is disposed for receiving a spring clip 92 therein which is disposed for resiliently engaging the surface of a corresponding one of the recesses 54. The spring clip 92 is retained in the recess 90 by means of a pin 94 extending through the plate 22.

It can be readily appreciated that the tool travel gauge of the present invention provides both coarse and fine adjustment of one of the limits of the tool length of travel. These adjustments can be made readily by the machine tool operator. Furthermore, it can be appreciated that the tool travel gauge of the present invention is relatively uncomplicated compared to prior known mechanisms and does not interfere with the adjacent operation of the machine tool. With the distance between the centers of adjacent recesses 54 being known, an operator can quickly and easily alter the position of the plate 22 and adjust the micrometer screw 24 to obtain the desired amount of a cutting stroke without the use of other measuring devices.

The invention claimed is:

1. In combination with a machine tool having a housing and means for displacing a tool along a longitudinal axis with respect to the housing to effect cutting of a workpiece,
   a mechanism for limiting the path of travel of the tool with respect to the workpiece comprising
   a. a member having a plurality of retaining surfaces spaced longitudinally from one another thereon with the distance between each defining a coarse adjustment,
   said member extending longitudinally in parallel with the longitudinal axis of the tool displacement,
   b. means defining a stop and disposed for being received on any one of said retaining surfaces,
   c. an abutment secured to the tool displacing means and disposed for movement therewith to engage said stop means, and
   d. means mounted between said housing and said member for effecting a fine adjustment of the relative longitudinal position thereof with respect to the housing.

2. A mechanism as defined in claim 1,
   wherein said member includes a plurality of recesses each defining a respective one of said retaining surfaces and spaced equally from one another along the length thereof,
   wherein said stop means is formed of a clip having a thickness equal to the width of each recess, and
   wherein said fine adjustment means is disposed for displacing said member with respect to the housing a distance at least equal to the distance between adjacent recesses.

3. A mechanism as defined in claim 2,
   wherein said member is a rod and said recesses are annular, and
   wherein said clip includes a spring conformably shaped to a substantial portion of the surface of each annular recess to firmly engage such surface.

4. A mechanism as defined in claim 1,
   wherein said fine adjustment means includes a micrometer screw having one end thereof mounted for rotation on the housing and having the other end thereof in threaded engagement with said member.

5. A mechanism as defined in claim 4,
   further comprising a manually rotatable member having a micrometer scale therein and secured to said one end of said micrometer screw, and
   a fiducial mark on the housing in relative proximity to an edge of the micrometer scale.

6. A mechanism as defined in claim 1,
   wherein said abutment is formed of a collar surrounding said member, and
   said stop means includes a manually insertable and retractable plate disposed for being received on a respective one of said retaining surfaces.

7. A mechanism as defined in claim 6,
   wherein said member includes a plurality of recesses each defining a respective one of said retaining surfaces and spaced equally from one another along the length thereof, and
   wherein said stop means further includes a spring clip attached to said plate and disposed for releasably engaging one of said recesses.

* * * * *